Figure 1:
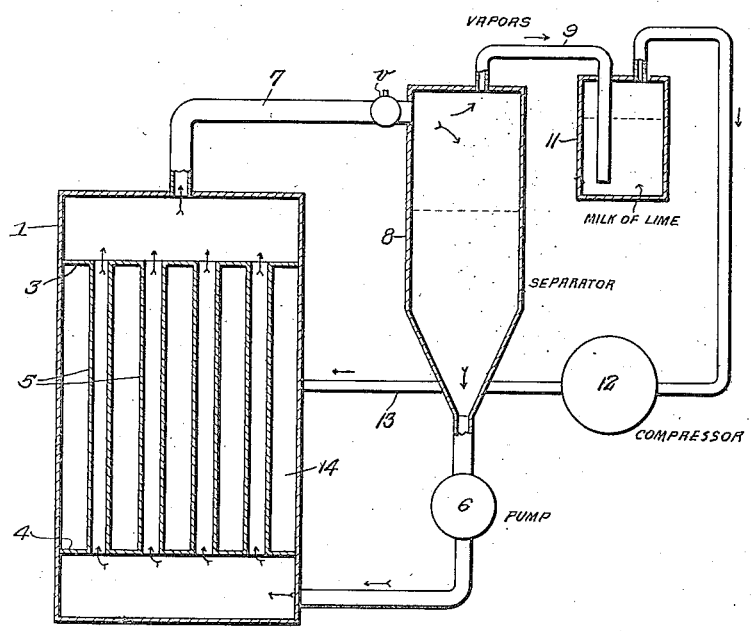

Dec. 26, 1922.

H. A. E. NILSSON.

METHOD OF EVAPORATING LIQUIDS GENERATING ACID VAPORS

FILED OCT. 1, 1918.

1,440,026.

2 SHEETS—SHEET 1.

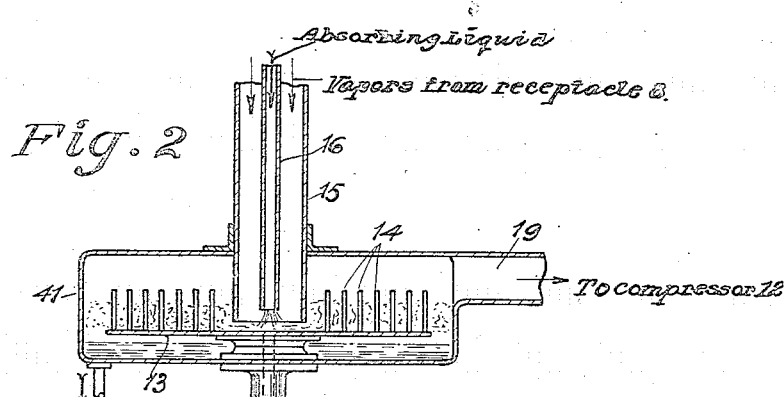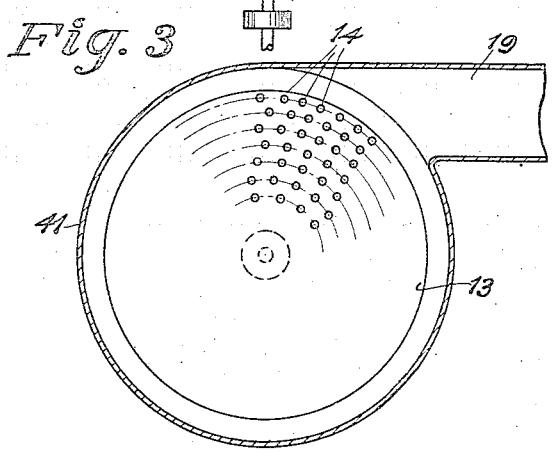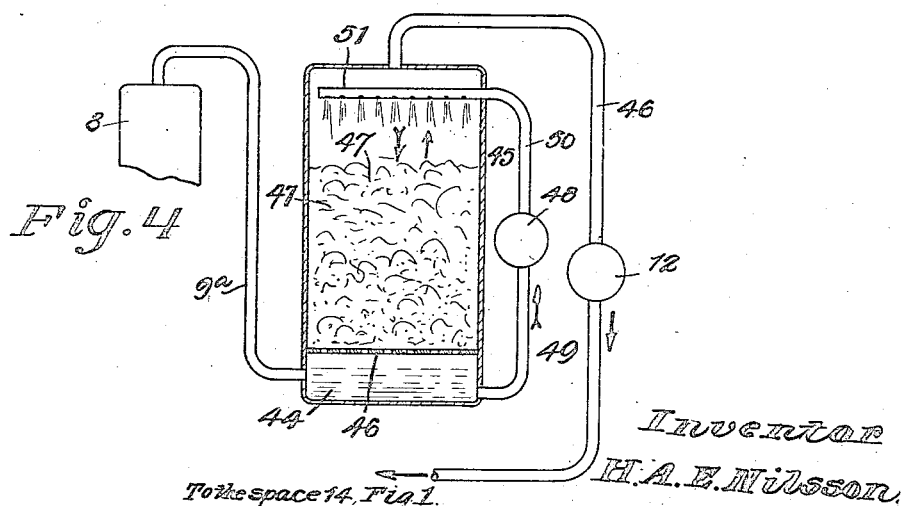

Patented Dec. 26, 1922.

1,440,026

UNITED STATES PATENT OFFICE.

HOLGER AUGUST ERIK NILSSON, OF HAMMARBY, STORVIK, SWEDEN.

METHOD OF EVAPORATING LIQUIDS GENERATING ACID VAPORS.

Application filed October 1, 1918. Serial No. 256,441.

*To all whom it may concern:*

Be it known that I, HOLGER AUGUST ERIK NILSSON, subject of the King of Sweden, residing at Hammarby, Storvik, in the Kingdom of Sweden, have invented certain new and useful Improvements in the Methods of Evaporating Liquids Generating Acid Vapors, of which the following is a specification.

On evaporating sulfite cellulose waste liquor, the best of the heretofore proposed processes involves the compression of the vapors escaping from the evaporation process (and thereby raising the temperature of the same), utilizing the same for evaporating the liquor by indirect transmission of heat to the latter. This method, however, possesses the drawback that the metallic parts of the compressor and of the heating apparatus are exposed to the corrosive action of acid constituents contained in the vapors, which acid vapors are formed due to the fact that the liquor on being heated is decomposed, whereby a great quantity of volatile substances, among other things volatile acids are delivered and escape with the vapors. Due to said corrosive action on the metallic parts of the compressor and of the heating elements (for instance iron or other metallic pipes in which the heating is effected) said apparatus are soon destroyed.

My present invention now refers to a method which has for its object to prevent such corrosive action and thus make the apparatus more durable.

My present invention now refers to a method which has for its object to prevent the formation of such an insulating layer on the heat transmitting surfaces. The invention consists chiefly in purifying the vapors, before they are brought in contact with the heat transmitting surfaces, and preferably before they are compressed, from acid constituents to such an extent that no corrosion, or a very slight corrosion of the metallic surfaces is effected. This result is attained by bringing said vapors into contact with absorbing agents for combining with the acid constitutents of the same. As an absorbing agent, milk of lime is especially suitable, but other bases may also be used.

The absorption process ought to be executed in apparatus where an intimate contact between the vapors and the absorbing agent can be effected for instance in absorption towers or "beating" apparatus (i. e., apparatus in which the vapors are beaten into the liquid absorbent). Such apparatus ought to be so constructed that the maintenance of a substantially clean contact surface between vapors and liquid is effected, so that salts and foam formed during the process and rendering a good contact of vapors and liquid difficult can be automatically removed from the zone of reaction and then led away from the apparatus. Moreover, the apparatus ought to be provided with devices for spraying a liquid, suitably the absorbing agent itself, on to the foam, so that the latter is broken up and disappears.

As the speed of reaction between the acid vapors and the absorbing agent is diminished in the same degree as the degree of acidity of the vapors it is important to diminish the degree of acidity as far as possible. In order to obtain this result it is generally not sufficient to expose the vapors to the action of one absorbing agent only. Another feature of my invention therefore consists in exposing the vapors to the action of two or several absorbing agents having different affinities for the acid constituents to be absorbed.

Another feature of my invention consists in exposing the vapors first to the absorbing agent having the lowest affinity for said acid constituents and then to one or more absorbing agents having increasing affinities for the same until said constitutents have been removed. It may for instance be suitable to expose the vapors first to the action of milk of lime and then to the action of sodium hydrate.

The absorbing agents may be used in the solid, liquid or gaseous state.

Another feature of my invention consists in using in the same process absorbing agents of different physical states. It may, for instance, sometimes be convenient to first expose the vapors to a liquid absorbing agent and then to a gaseous one (i. e., a volatile alkali, such as ammonia), or first to a liquid agent then to a solid agent and finally to a gaseous absorbing agent and so on. The compression of the vapors may be effected before, during or after the execution of the different steps of the absorption process, or between the successive steps of the neutralizing operation.

The present method is especially suitable to be used in evaporating sulfite cellulose waste liquor, but the same is not limited to such use. It can be applied in all cases where acid vapors are generated from a liquid to be evaporated.

The process can be carried out in apparatus such as shown in the accompanying drawing, in which Fig. 1 shows a vertical section of a complete apparatus, given by way of example. Figs. 2 and 3 show respectively a vertical section and a horizontal section of a beating apparatus in which the vapors and absorbent liquid are contacted, and Fig. 4 shows a tower which may be used for this purpose, either as a substitute for the beating apparatus, or in combination therewith.

Referring now more particularly to Fig. 1 of said drawing, 1 is a receptacle having tube sheets 3 and 4, connected to tubes 5 forming the heating elements and through which the liquid to be evaporated (for instance sulfite liquor) is forced by means of the pump 6. The heated liquor passes through pipe 7 past a pressure reducing valve V into a receptacle 8 in which there exists a pressure substantially lower than that existing in the pipe 7. Consequently evaporation takes place in the receptacle 8, the vapors escaping through pipe 9 into a tank 11 containing milk of lime or other liquid capable of absorbing acids in the vapors. The vapor is compressed by the compressor 12 and passes through pipe 13 into the space 14 surrounding the heating pipes 5.

In place of the element 11 of the apparatus above described (or in addition thereto if desired) may be used the beating apparatus shown in Figs. 2 and 3, in which the vapors leaving receptacle 8 are introduced into casing 41 through tube 15, while the absorbing liquid is introduced through pipe 16. A plate 13 carrying vertical plugs 14 may be revolved so as to beat the vapors into the absorbing liquid. The vapors are then led off through pipe 19 to a compressor 12, as shown in Fig. 1. This plate 13 may be rotated by the vertical shaft 42. The absorbing liquid can be led off by pipe 43.

In employing the tower apparatus as shown in Fig. 4, the vapors from receptacle 8 pass by pipe 9$^a$ into the lower compartment 44 of a tower 45 the vapors being led off by pipe 46 to the pump or compressor 12, thence to space 14 (Fig. 1). The tower 45 has a perforated false bottom or grate 46 on which may rest a filling material as coke 47, over which the absorbent liquid from 44 is repeatedly sprayed by the pump 48 and pipes 49 and 50, the latter communicating with a suitable spraying device, conventionally illustrated in Fig. 4, by the perforated pipe 51, which as shown may be horizontal if desired.

It will be understood however, and I desire to make it perfectly clear that the invention is by no means restricted to the employment of the apparatus herein illustrated, which is included in the present case solely for the purpose of illustration, and in compliance with an official requirement for illustration.

It is understood that one or more of the above types of absorbers, for absorbing the acid vapors from the gas, can be employed, or other types of absorbers can likewise be used, alone or in any desired combinations, the scope of the invention being only restricted by the scope of the appended claims.

I claim:—

1. In the method of evaporating liquids which generate acid vapors and in which method said vapors are compressed and brought into contact with metallic heating elements for indirectly heating the liquid, undergoing evaporation, the step of removing the acid constituents from said vapors, before the same are brought into contact with said heating elements, to such an extent that no corrosion of the same can be effected.

2. The herein described method of evaporating liquids generating acid vapors, comprising removing acid constituents from the vapors, compressing the remaining vapors and bringing the same in contact with metallic heating elements containing the liquid to be evaporated for heating such liquid.

3. In the method of evaporating liquids which evolve acid vapors, by compressing the vapors and bringing the same into heat-transferring relation with the liquid undergoing evaporation, while said compressed vapors are not in actual contact with such liquid, the hereindescribed improvement which comprises subjecting the vapors containing acid-reacting ingredients to absorption by an alkaline absorbent, before they are used for heating said liquid.

4. The application of the process of claim 3, to the evaporation of sulfite cellulose waste liquor in an acid state.

5. In the process of claim 3, the steps of subjecting the vapors containing acid-reacting ingredients to a series of absorbing agents of successively increasing acid-neutralizing activities.

In testimony whereof I have affixed my signature in presence of two witnesses.

HOLGER AUGUST ERIK NILSSON

Witnesses:
 AXEL EHRNER,
 JACOB BAGGE.